(12) United States Patent
Reznik et al.

(10) Patent No.: US 9,554,270 B2
(45) Date of Patent: Jan. 24, 2017

(54) ENHANCED SECURITY FOR DIRECT LINK COMMUNICATIONS

(71) Applicant: InterDigital Patent Holdings, Inc., Wilmington, DE (US)

(72) Inventors: Alexander Reznik, Titusville, NJ (US); Yogendra C. Shah, Exton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/543,344

(22) Filed: Nov. 17, 2014

(65) Prior Publication Data

US 2015/0074411 A1    Mar. 12, 2015

Related U.S. Application Data

(63) Continuation of application No. 12/639,293, filed on Dec. 16, 2009, now Pat. No. 8,892,874.

(Continued)

(51) Int. Cl.
  *H04L 9/14* (2006.01)
  *H04W 12/04* (2009.01)
  (Continued)

(52) U.S. Cl.
  CPC .............. *H04W 12/04* (2013.01); *H04L 9/083* (2013.01); *H04L 9/0822* (2013.01);
  (Continued)

(58) Field of Classification Search
  CPC ...... H04L 9/0822; H04L 9/321; H04L 63/162; H04L 9/0833; H04L 9/0841; H04L 9/083; H04W 12/04; H04W 12/08; H04W 76/023
  See application file for complete search history.

(56) References Cited

U.S. PATENT DOCUMENTS 7,461,253 B2   12/2008   Braskich et al.
7,675,867 B1    3/2010   Mraz et al.
(Continued)

FOREIGN PATENT DOCUMENTS

CN   1222014 A   7/1999
CN   1567875 A   1/2005
(Continued)

OTHER PUBLICATIONS

Chu et al., "TDLS Setup," IEEE 802.11-08/0290r0 (Mar. 12, 2008).
(Continued)

*Primary Examiner* — Saleh Najjar
*Assistant Examiner* — Devin Almeida
(74) *Attorney, Agent, or Firm* — Volpe and Koenig, P.C.

(57) ABSTRACT

A method and apparatus for secure direct link communication between multiple wireless transmit/receive units (WTRUs) are disclosed. The WTRUs may exchange nonces that are used for generating a common nonce. Group identification information may be generated from at least the common nonce and is forwarded to an authentication server. The authentication server may generate a master key from the group identification information to match WTRUs as part of a key agreement group. The common nonce may be a session key and be refreshed during communication with the second WTRU. A group key encryption key (GKEK) and a group key confirmation key (GKCK) may also be generated based on the common nonce and used to encrypt and sign the master key so that base stations do not have access to the master key. A first WTRU may generate a group direct link temporal key (GDLTK) for communicating with the second WTRU.

20 Claims, 8 Drawing Sheets

Related U.S. Application Data

(60) Provisional application No. 61/138,320, filed on Dec. 17, 2008.

(51) Int. Cl.
| | | |
|---|---|---|
| *H04L 9/08* | (2006.01) | |
| *H04L 9/32* | (2006.01) | |
| *H04L 29/06* | (2006.01) | |
| *H04W 12/08* | (2009.01) | |
| *H04W 76/02* | (2009.01) | |

(52) U.S. Cl.
CPC .......... *H04L 9/0833* (2013.01); *H04L 9/0841* (2013.01); *H04L 9/321* (2013.01); *H04L 63/162* (2013.01); *H04L 2209/80* (2013.01); *H04W 12/08* (2013.01); *H04W 76/023* (2013.01)

(56) References Cited

U.S. PATENT DOCUMENTS

| | | |
|---|---|---|
| 2003/0028773 A1 | 2/2003 | McGarvey et al. |
| 2004/0161110 A1 | 8/2004 | Kanai et al. |
| 2005/0226420 A1 | 10/2005 | Makela et al. |
| 2006/0106933 A1 | 5/2006 | Huang et al. |
| 2006/0198368 A1 | 9/2006 | Guichard et al. |
| 2007/0097934 A1* | 5/2007 | Walker et al. ................. 370/338 |
| 2007/0162751 A1 | 7/2007 | Braskich et al. |
| 2007/0192600 A1 | 8/2007 | Wong et al. |
| 2008/0016350 A1 | 1/2008 | Braskich et al. |
| 2008/0307110 A1 | 12/2008 | Wainner et al. |
| 2009/0063851 A1* | 3/2009 | Nijdam ......................... 713/155 |
| 2009/0217033 A1 | 8/2009 | Costa et al. |

FOREIGN PATENT DOCUMENTS

| | | |
|---|---|---|
| EP | 1965558 A1 | 9/2008 |
| JP | 2003-283489 | 10/2003 |
| JP | 2005-223773 | 8/2005 |
| JP | 2009290378 A | 12/2009 |
| WO | 2007/146364 | 12/2007 |
| WO | 2007149024 A1 | 12/2007 |

OTHER PUBLICATIONS

Halasz et al., "Tutorial—Using OUI's to Identify Cipher and AKM Suites," IEEE P802.11 Wireless LANs, IEEE 802.11-04/0588r0 (May 2004).

IEEE P802.11z/D3.0 Draft Amendment for Direct Link Setup (Nov. 2008).

IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std 802.11-2007 (Jun. 2007).

Wentink et al., "Tunneled Direct Link Setup (TDLS)," IEEE P802.11 Wireless LANs (Sep. 19, 2007).

Zhiming et al., "Normative Text for Extended Usage of STKSA," IEEE P802.11 Wireless LANs (May 5, 2008).

* cited by examiner

ENHANCED SECURITY FOR DIRECT LINK COMMUNICATIONS

CROSS REFERENCE TO RELATED APPLICATIONS

This application is a continuation of U.S. patent application Ser. No. 12/639,293 filed Dec. 16, 2009, which claims the benefit of U.S. Provisional Application No. 61/138,320 filed Dec. 17, 2008, the contents of which are hereby incorporated by reference herein.

FIELD OF INVENTION

This application is related to wireless communications.

BACKGROUND

In conventional infrastructure-based wireless systems, wireless transmit/receive units (WTRUs) that may wish to communicate with each other must communicate with each other through a base station, even if they could, in principle, communicate with each other directly. The result is an inefficient use of air interface resources as data that could be sent over the wireless medium once (from source to destination) is sent twice (from source to base station and then from base station to destination). There is also an inefficient use of network resources, including for example, base station bandwidth, power, bandwidth of the network backhaul links, and other related resources.

Direct link communications is an alternative means of communications that may be used between the WTRUs. In direct link communications, even though the WTRUs may belong to the network and maintain their connection with the base station, they also establish a communication link to send data back and forth to each other directly. This aspect of their communication may occur with or without involvement of the base station and may or may not be controlled or scheduled by the base station. For example, the direct link communications may occur in a different frequency range from that used by the base station.

In either case, the base station does not attempt to receive such communication. The key characteristic of a direct communication link is that a communication that is directly sent from one WTRU to another bypasses an infrastructure node, for example a base station or access point, that connects the localized wireless network to a larger "backbone" network. The direct link communication may be generalized to include a wireless relay.

Establishing and maintaining a properly secure connection in a direct link communication environment is problematic for several reasons. For example, security methods, such as Wi-Fi Protected Access-2 (WPA-2) in Institute Of Electrical and Electronics Engineers (IEEE) 802.11, require that the WTRUs access and communicate with base stations to establish security. The base station in these instances is only involved in facilitating a connection to some other network node such as a Remote Authentication Dial In User Service (RADIUS) or Authentication, Authorization, and Accounting (AAA) server. This network-enabled security approach is contrary to direct link communications which attempts to reduce or eliminate any need for the WTRUs to communicate with any network nodes.

In other approaches, the WTRUs establish a secure connection to a network node, such as a base station, to enable a simple key establishment process for security. Here, however, although secure links to network nodes (including the base station) may be established to protect against attacks on the communication links (especially on the WTRU-base station wireless links), the network nodes themselves (including the base station) may not be fully trusted. In particular, the WTRUs wishing to establish a direct link with each other may want to keep their direct link communication secure from the network. This is not possible using many current network-enabled approaches. Thus, a direct link key refresh mechanism may be desirable.

Moreover, a direct link may be established for various purposes with various security requirements. Therefore, it may be desirable to enable the WTRUs setting up such the direct link to select a security and key management method appropriate for each particular application. Current methods do not allow the WTRUs to select how the direct link is protected.

SUMMARY

A method and apparatus for enhancing security in direct link communications between multiple wireless transmit/receive units (WTRUs) are disclosed. The WTRUs exchange nonces that are used for generating a common nonce. A group identification information element (GIIE) is generated from at least the common nonce and is forwarded to an authentication server. The authentication server generates a group direct link master key (GDLMK) from the GIIE to match WTRUs as part of a key agreement group. Group key encryption key (GKEK) and a group key confirmation key (GKCK) are also generated based on the common nonce and are used to encrypt and sign the GDLMK so that base stations do not have access to the GDLMK. Also disclosed is a method for selecting a key management suite (KMS) to generate temporal keys. A KMS index (KMSI) may be set according to a selected KMS, transmitted to another WTRU and used to establish a direct link.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a mobile equipment, a fixed or mobile subscriber unit, a pager, a cellular telephone, a personal digital assistant (PDA), a computer, a wireless local area network (WLAN) based unit, or any other type of user device capable of operating in a wireless environment. When referred to hereafter, the terminology "base station" includes but is not limited to a Node-B, a site controller, an access point (AP), wireless local area network (WLAN) AP, cellular base station or any other type of interfacing device capable of operating in a wireless environment.

As used herein, an "infrastructure-based" wireless system is one where links to WTRUs are facilitated by some network entity or node, such as a base station (BS). Such an entity is responsible for communicating with all WTRUs associated with it and facilitates all communications for such WTRUs including for example, access to the internet, and communications with other nodes in the same and other networks. For the purposes of this description, all such network nodes or entities are referred to as base stations and all user nodes are referred to herein as WTRUs.

Figure 1:
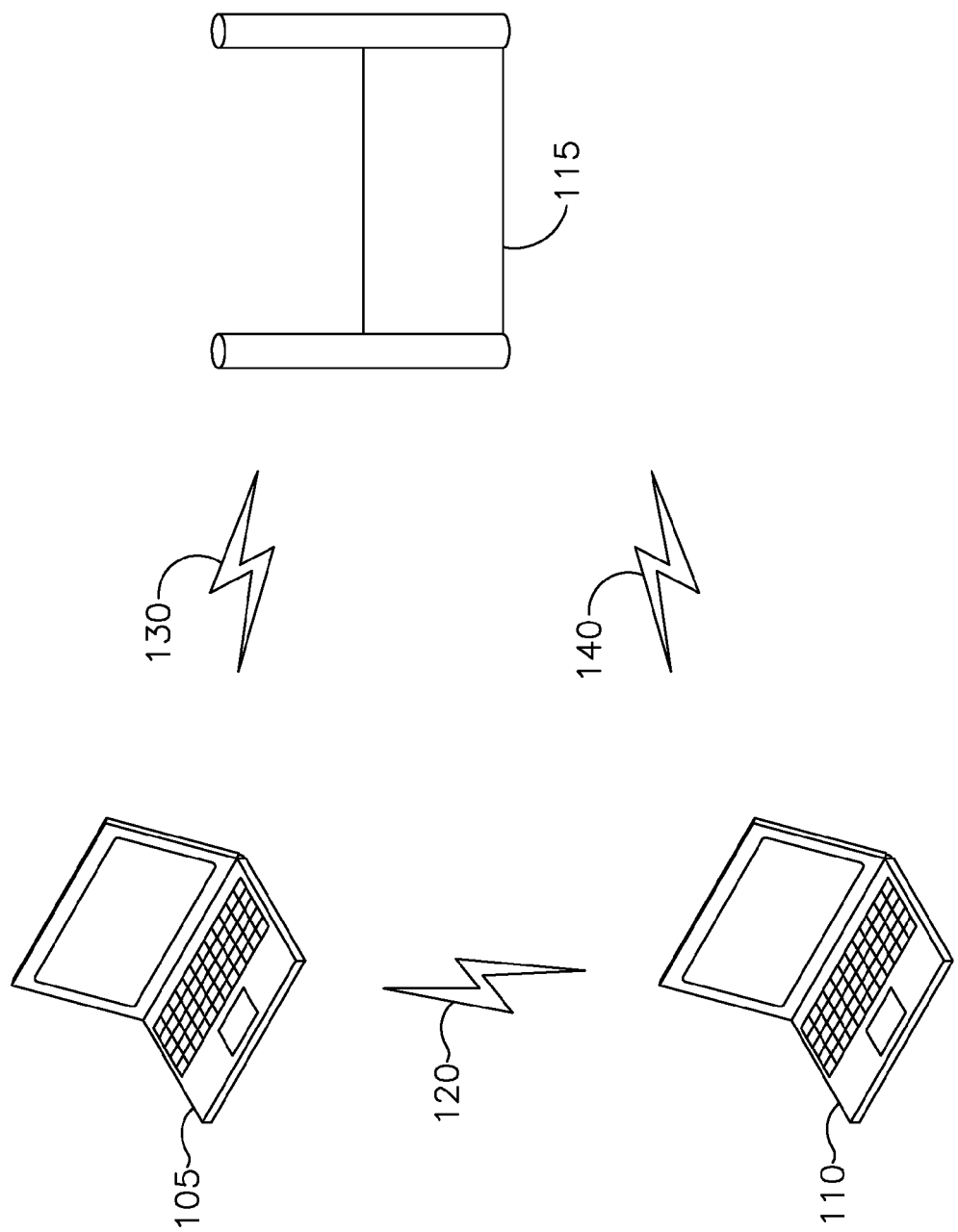
FIG. 1 is a diagram showing a configuration for direct link communications.

A direct link communications architecture is shown in FIG. 1. WTRU 105 and 110 are in communications with a base station 115 via communication links 130 and 140, respectively. In addition, WTRU 105 and WTRU 110 are in direct link communications via communications link 120 established using the methods described herein. WTRUs 105 and 110 send data back and forth to each other directly without the base station receiving any of the data.

Figure 2:
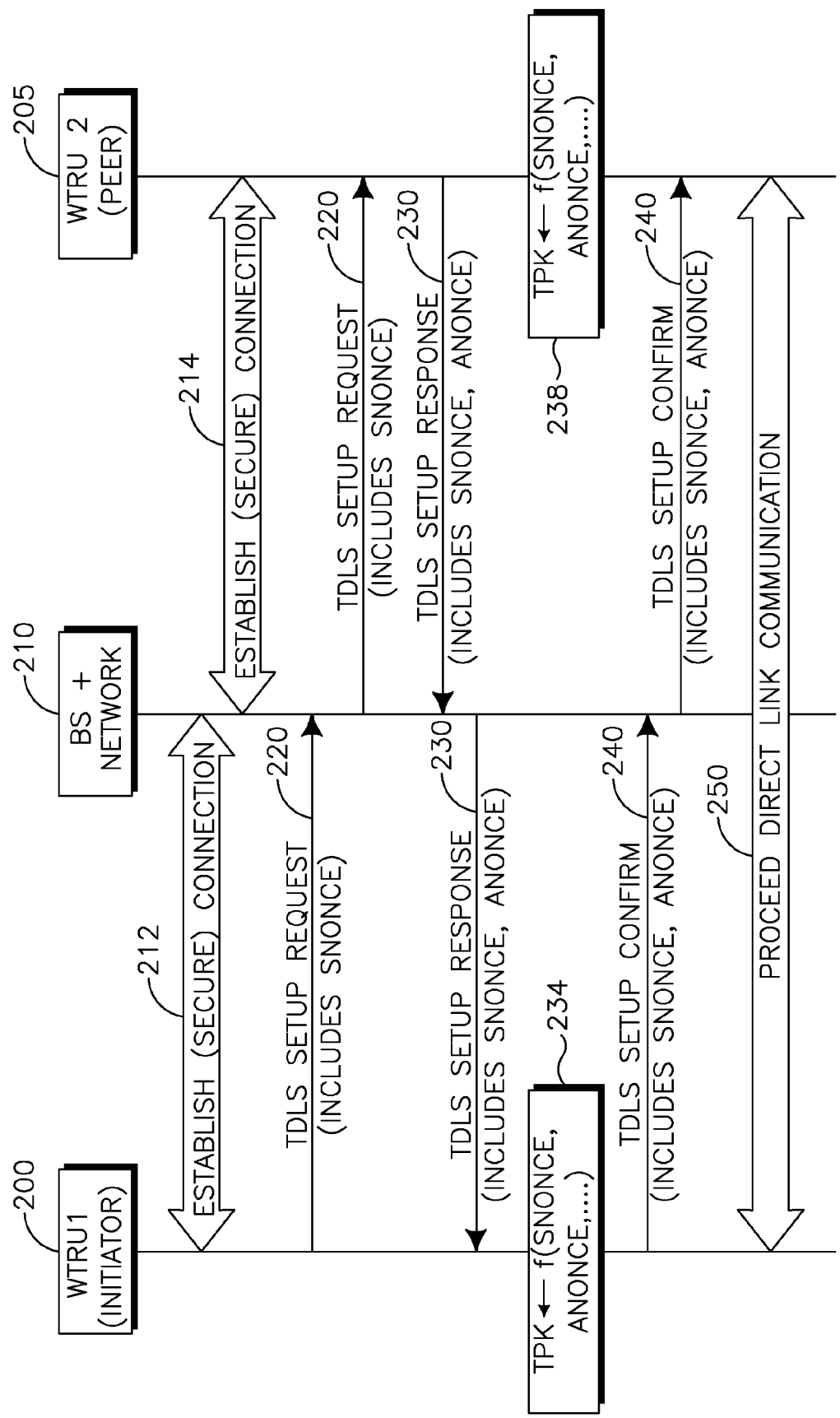
FIG. 2 is a diagram showing a conventional message sequencing for establishing a direct link.

A current direct link method is shown in FIG. 2 to illustrate the shortfalls of existing approaches to direct link security and as a basis for some of the embodiments disclosed herein. In particular, the security aspects of IEEE 802.11z are presented. Two WTRUS, WTRU1 200 and WTRU2 205, have already established connections 212 and 214 to the base station and network 210, respectively. These established connections are used to send messages to each other using a "tunnel", where the messages appear as just data to the base station. The tunnels are used to set up a direct link between WTRU1 200 and WTRU2 205. Standard 802.11 security may be used to provide the over-the-air security of these messages when they are transmitted between WTRU 200 and WTRU 205 and network and base station 210.

In this method, WTRU1 200 acts as the "initiator" of the direct link and WTRU2 205 acts as its "peer." The direct link establishment consists of three Messages—tunneled direct link setup (TDLS) Setup (from WTRU1 200 to WTRU2 205), TDLS Response (from WTRU2 205 to WTRU1 200) and TDLS Confirm (from WTRU1 200 to WTRU2 205). If this three-message handshake is successful, a direct link 250 between WTRU1 200 and WTRU2 205 is established once this exchange is complete (and maybe after some agreed upon delay thereafter).

If direct link security is desired, the three-message handshake described above may be used to establish a pair-wise key between WTRU1 200 and WTRU2 205. WTRU1 200 generates a SNonce (a random number) and forwards it to WTRU2 205 as part of the TDLS Setup message 220. WTRU2 205 generates a ANonce (a second, independent random value) and forwards it back to WTRU1 200 in the TDLS Response message 230. WTRU2 205 may also send the SNonce back to WTRU1 200 to associate the TDLS Setup Response 230 with the TDLS Request 220. WTRU1 200 and WTRU2 205 use SNonce and ANonce to generate a common key, shown as 234 and 238, respectively. WTRU1 200 and WTRU2 may also use other information they know, such as each other's medium access control (MAC) addresses, IP address, proprietary information or other identifying information for common key generation. WTRU1 200 forwards SNonce and ANonce back to WTRU2 205 as part of the TDLS Confirm message 240. TDLS Confirm message 240 may also confirm key generation.

The resulting key is therefore based on just two random values, SNonce and ANonce, and depends on preserving the secrecy of these two values. The over-the-air secrecy of these values is assured because of the security of the over-the-air communication between the WTRU 200 and 205 and the base station 210. It is assured if the base station does not 1) expose the SNonce and the ANonce exchanged by the initiator and peer to any external party; 2) use these the SNonce or ANonce to derive a TDLS Peer Key (TPK) and attack the downlink (DL) instance; and 3) TDLS message security processing at the base station, such as the encryption and integrity computations, is protected from illegal eavesdropping, alterations, insertions and substitutions. Note that the term "peer" in TPK may also include but is not limited to "pairwise".

Although IEEE 802.11 over-the-air security may be sufficient to preserve the secrecy of the nonces, the base station provisions described above are significantly deficient and would not be satisfied by a large number of base stations. In particular, the base station provisions may be satisfied only if the base station is assumed to be a completely trusted device, without any means of verification. This is not a reasonable assumption in many applications. For example, the base station may eavesdrop on the direct link conversation or may be compromised to launch a man-in-the-middle attack since this method provides no protection against the base station establishing the direct link keys. Thus, except when the base station can be attested to be a trusted entity, the current approach is insufficient. Moreover, no method for key exchange is provided except the one outlined above. In particular, it is not possible to perform a key refresh on the existing direct link, except by resorting to the TDLS setup handshake, which results in a re-set of the link.

Methods for enhancing security, including embodiments for key management, for direct link communications are disclosed based on each WTRU knowing the identity of the other WTRUs. The identities may include, for example but not limited to, medium access control (MAC) identification (ID), application specific ID, Internet Protocol (IP) address, subscriber identity module (SIM) identity, or any value or token that identifies the WTRU. It is also assumed that the access, authorization and accounting (AAA) server may securely bind the WTRU identities, as they are known to each other, to the identities it is aware of. The AAA server may be the trusted entity which may facilitate TDLS key establishment. The trusted entity may be any server that performs authentication and key suite generation, such as for example, but not limited to, a web site server.

Methods for implementing key management for direct links may, at a high-level, be partitioned into four categories. First, the key may be negotiated over the air using the base station as a trusted relaying source. Second, a pre-shared key may exist between the two or more WTRUs and may be used to establish a temporal key. This key may then be used in a fairly straightforward fashion using procedures such as the pre-shared key (PSK) handshake used in other 802.11 security modes.

In a third category, a key may be derived using a public key exchange procedure, such as the Diffie-Helman procedure. In this procedure, the WTRUs may exchange information which is normally exchanged in the clear via the base station in the TDLS exchange. The key established between the WTRUs may be concealed from the base station. Since, for the purposes of these procedures, it is presumed that the WTRUs have already been authenticated to the base station, it has also been established that the WTRUs can trust each other. By involving the base station in the process of establishing the key via the TDLS procedure, the WTRUs may ensure that they are indeed communicating with each other and not to, for example, some adversarial entity. This method is disclosed in more detail below with reference to FIGS. 4-6.

In a fourth category, a key may be negotiated with the help of a trusted entity in the network, such as an AAA server. Here, the base station may facilitate communication with the trusted entity. However, the resulting key may be completely secure from the base station. In some embodiments, the method may require that two different WTRUs end up with the same exact key and that the base station remain oblivious to it. This method may provide an additional benefit in that it may allow the WTRUs to mutually authenticate each other via a trusted third party. This method is disclosed below in more detail with respect to FIG. 3.

Figure 3:
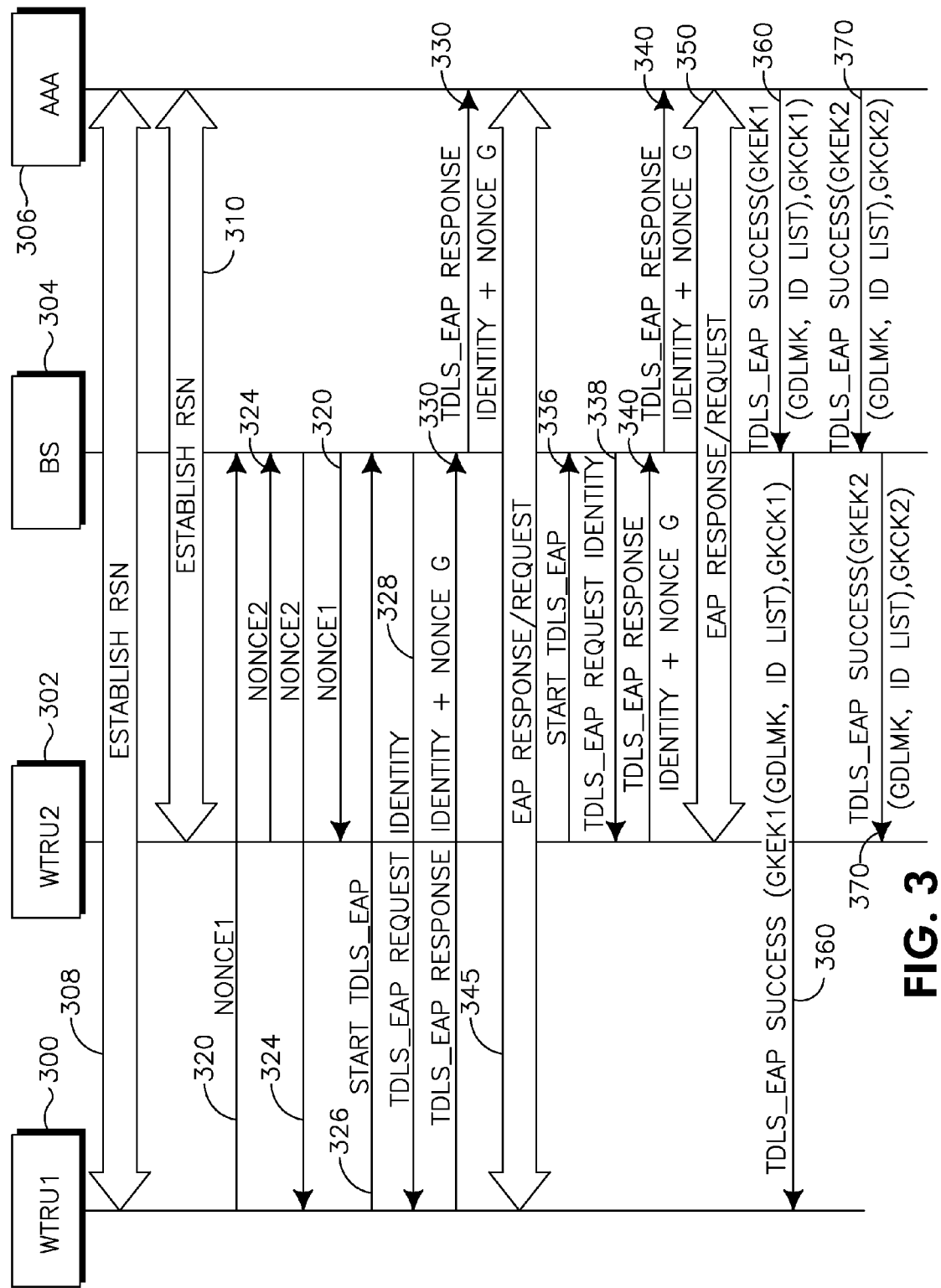
FIG. 3 is a diagram showing a group key agreement procedure according to an embodiment.

Referring to FIG. 3, a TDLS_EAP (extensible authentication protocol) example method for direct link authentication and key agreement is disclosed. Note that the tunnels through the base station 304 are shown as a sequence of two messages to make it clear that the base station 304 forwards this information. The example method is illustratively shown with respect to a WTRU1 300, a WTRU2 302, a base station 304 and a AAA server 306. Initially, a robust security network (RSN) key hierarchy 308 and 310 may be established for WTRU1 300 and WTRU2 302. The RSN 308 and 310 may be established by using a standard extensible authentication protocol (EAP) procedure to authenticate WTRU1 302 and WTRU2 304 to AAA server 306. A pair-wise master key (PMK) may be established for each WTRU and communicated to the base station (BS) 304. As a result, all communications, i.e., WTRU1-AP, WTRU2-AP and AP-AAA, except the direct WTRU1-WTRU2 link, are secure.

An example method, referred to herein as TDLS_EAP, may be used to enhance the security of the direct WTRU1-WTRU2 link as follows. First, WTRU1 300 and WTRU2 302 may exchange nonces and generate a group nonce. This may be accomplished by having WTRU1 300 send a Nonce1 to WTRU2 302 (message 320) and having WTRU2 302 send a Nonce2 to WTRU1 300 (message 324). WTRU1 300 and WTRU2 302 may generate a common NonceG, where NonceG may be a secure combination of Nonce1 and Nonce2.

The generation and transmission of the NonceG is disclosed herein. Generation of NonceG may be kept simple to preserve maximal randomness. One example method may use a bit-wise exclusive OR (XOR). Another example method may perform a hash of Nonce1 and Nonce2 to obtain NonceG.

It is noted that repeated transmission of the same nonce may provide an opportunity for a replay attack to a potential over-the-air eavesdropper such as for example, a device attempting to break the standard 802.11 RSN, but not necessarily the base station. This weakness may be observed in the proposed FIG. 2 where SNonce is transmitted three times between the base station and the WTRUs and ANonce is transmitted two times between the base station and the WTRUs. The embodiments described herein may avoid this by transmitting Nonce1 and Nonce2, for example, only once between each pair of WTRUs. However, NonceG may be transmitted several times by each terminal. This may be avoided by securely hashing NonceG with the identity sent to the AAA server in the TDLS_EAP Response Identity messages shown in FIG. 3 and disclosed herein.

Next in the TDLS_EAP example method, WTRU1 300 and WTRU2 302 may each execute a modified EAP method with the AAA server 306. WTRU1 300 may execute the standard EAP procedure with the AAA server 306 (message 326) and WTRU2 302 may execute the standard EAP procedure with the AAA server 306 (message 336). In accordance with the example method, WTRU1 300 and WTRU2 302 not only send their identities (as disclosed previously) in response to the TDLS_EAP Request Identity from base station 304 (messages 328 and 338, respectively) but also forwards a group identification information element (GIIE) to the AAA server 306 (messages 338 and 340, respectively). The GIIE provides a common nonce in the group key generation procedure and a way for the AAA server 306 to identify and associate the group of WTRUs that want to establish a common key. The GIIE identifies all WTRUs belonging to the same group. As such, the GIIE should at least contain the NonceG. It may also contain a list of WTRU IDs that may attempt to establish the key. Other common elements may also be contained. As a result of using the GIIE, Protected EAP may be used instead of standard EAP, for example, to make sure that all over-the-air communications between the WTRUs and the base station are encrypted just like all the other data.

The AAA server 306 may authenticate WTRU1 300 and WTRU2 302 using the standard EAP procedure (messages 345 and 350, respectively). However, the AAA server 306 does not generate the pair-wise master key (PMK). The AAA server 306 may use the GIIE to group WTRU1 300 and WTRU2 302 in a key agreement group and create a group direct link master key (GDLMK). At the highest level, the GDLMK may be a sufficiently random secret string which the AAA server may communicate secretly to the WTRUs 300 and 302. The GDLMK may be just a random (or pseudo-random) string which the AAA may generate. Alternately, the GDLMK may be derived from any of the WTRU IDs, WTRU strong secrets or the NonceG. In an embodiment, the GDLMK may be bound to the WTRU ID and/or NonceG. Independent of the initial key establishment method used, WTRU1 300 and WTRU2 302 share a GDLMK that may then be used to generate temporal keys which may be used for communication.

For each WTRU as represented by an index i, the AAA server 306 may generate a Group Key Encryption Key (GKEK$_i$) and a Group Key Confirmation Key (GKCK$_i$) using the authentication credentials for WTRU i only and the GIIE. By binding the GKEK and GKCK, maximum security is provided. The authentication credentials may be, for example, the encryption and authentication key previously negotiated between AAA server 306 and each WTRU using the EAP protocol or a new set of keys derived from such previously negotiated hierarchy. Alternatively, the AAA server 306 may use WTRU IDs. GKEK and GKCK may be generated in the same way as Key Encryption Key (KEK) and Key Confirmation Key (KCK) are generated in standard EAP via a PMK (where the PMK may be generated for each WTRU as an intermediate step). However, unlike the standard EAP, neither the GKEK nor the GKCK (nor the intermediate PMK) are disclosed to the base station. WTRUs 300 and 302 may generate their own GKEK and GKCK as in the standard EAP and may use these to decrypt messages 360 and 370 sent by the AAA server 306 as disclosed below. As in the standard EAP, these will be the same as those generated by the AAA server 306. The AAA server 306 may communicate the GDLMK to every WTRU, which in this case is WTRU 300 and 302. In addition, it may communicate the full list of WTRU identities for which the GDLMK has been generated. The communication of the GDLMK and identities list to WTRU i may be encrypted with $GKEK_i$ and signed with $GKCK_i$ (messages 360 and 370). Note that the base station may not know GKCK and GKEK (they may not be provided to the base station and the security of the standard EAP exchange against the base station may ensure the security of these as well). Thus, the GDLMK may be kept secret from the base station, and the base station cannot tamper with it.

Although the exchange of Nonce1 and Nonce2 is shown as sequential in FIG. 3, it may be done in any reasonable order. Moreover, the TDLS_EAP exchange with each WTRU may be independent of the exchange with the other WTRUs and may happen serially (as shown), in parallel or in any other order. However, success may not be acknowledged until all exchanges are complete—this is because the success message carries the GDLMK which may not be generated until all WTRUs have been authenticated. In addition, any third party authenticator with key generation capability, capable of running an EAP-like authentication and key generation procedure, may be substituted for the AAA server 306. This may be application specific, e.g. if WTRU1 300 and WTRU2 302 wish to establish a direct link to participate in an interactive online game, the game server may act as an authenticator.

In executing the TDLS_EAP method disclosed herein, the WTRU1 300 and WTRU2 302 have been mutually authenticated. Additionally, they may share a GDLMK, which is a master key that may be used to generate temporal keys using standard approaches. For example, GDLMK may serve as the master root in a standard key hierarchy.

The TDLS_EAP method may be secure against any malicious behavior by the base station. For example, if the method completes, the GDLMK is secure from the base station and if the method fails, it does so without leaking any information to the base station that the base station did not already have. This may be established by analyzing the possible malicious behavior that may be brought on by the base station and demonstrating the responses to the specific malicious behavior. In one instance, the base station may tamper with general communication. Here, the result may be a failure of the method. In another instance, the base station may tamper with Nonce1 and/or Nonce2. Here, the result may be that WTRU1 300 and WTRU2 302 may not generate the same NonceG and the AAA server 306 does not generate a GDLMK for WTRU1 300 and WTRU2 302. In yet another instance, the base station may tamper with NonceG in the path between WTRU1 300/WTRU2 302 and the AAA server 306. Here, the result may be that the GKCK's and GKEK's are different than expected by WTRUs 300 and 302 and may be rejected. Consequently, the key establishment procedure may fail. In another instance, the base station may attempt to decrypt/tamper with the GDLMK. It may not be able to, however, because this is secured and signed using keys which the base station does not possess. The base station may also use and/or modify the GIIE to attach its own ID to become "part of the group" and may be listed in the final message along with the GDLMK. Legitimate terminals may identify this as a terminal that should not be part of the group and will reject the GDLMK as the GIIE is used in the generation of the GKCK and GKEK. Thus, if the base station modified the GIIE, the WTRUs would generate different GKCKs and GKEKs and would not be able to decrypt the GDLMK. The base station's actions would therefore be detected through failure of the protocol. Once the TDLS_EAP method is completed and a GDLMK has been established between WTRU1 300 and WTRU2 302, the key refresh method is straightforward. The key refresh method may result in the generation of group direct link temporal keys (GDLTK's), which may be used for communication and are refreshed. Depending on which method of initial key establishment is used, the key refresh methods disclosed herein may be used for key refresh. In one embodiment, standard key hierarchy methods may be used. Another embodiment may use physical-layer enabled key generation and yet another embodiment may use a public-key exchange supported method.

Figure 4:
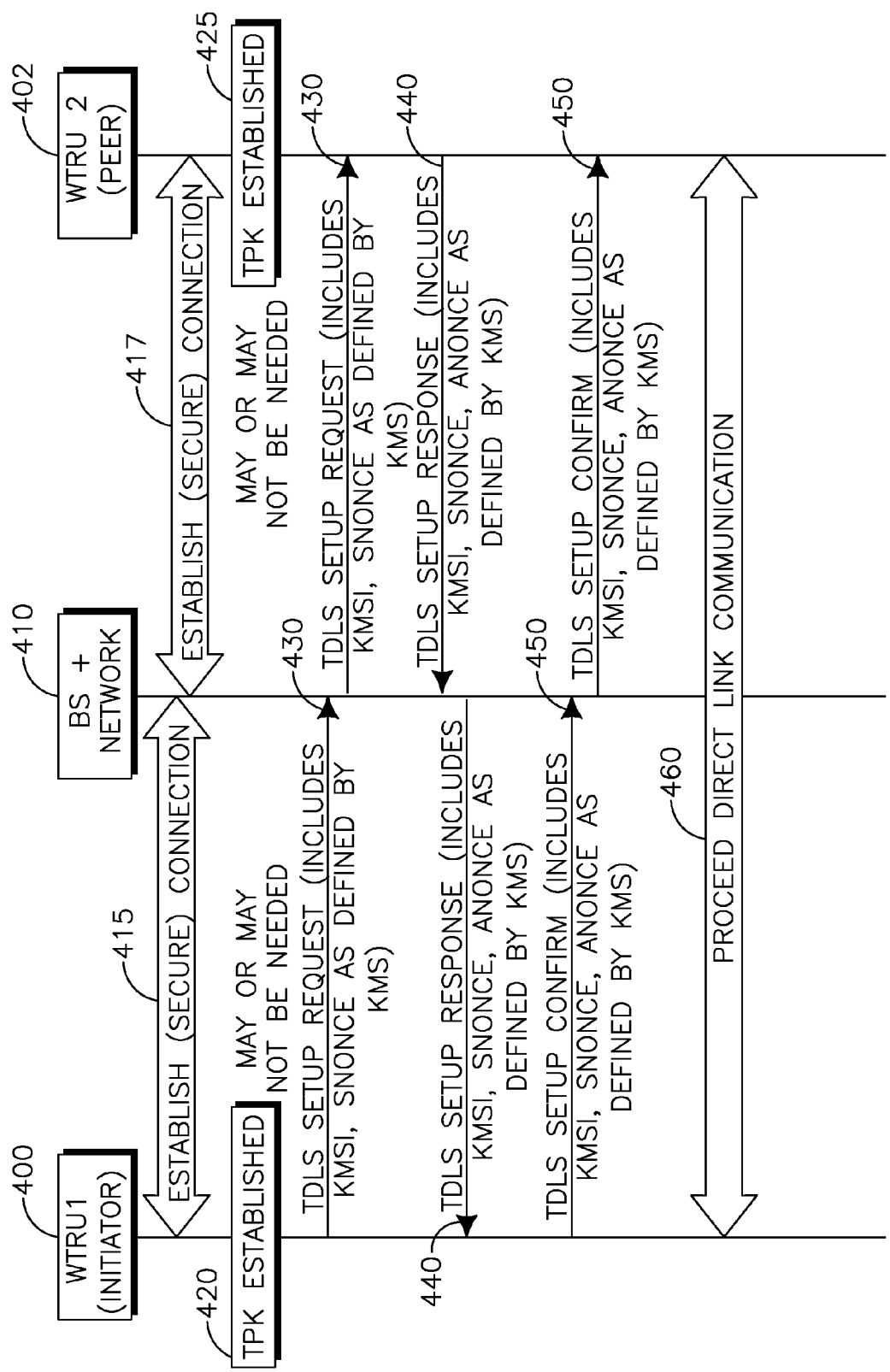
FIG. 4 is a diagram showing a key exchange method according to an embodiment.
Figure 5:
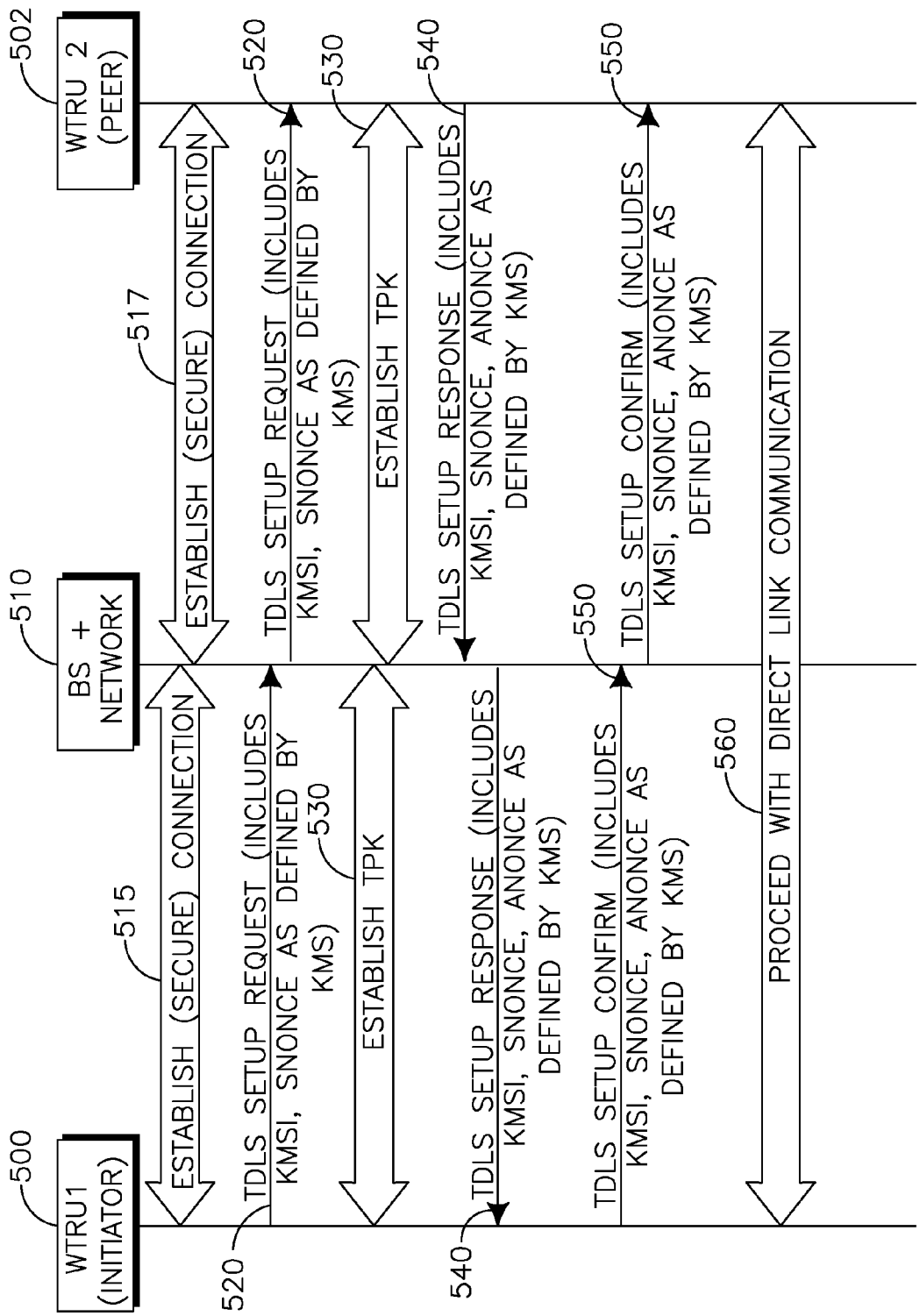
FIG. 5 is a diagram showing a key exchange method according to an embodiment.

The embodiments disclosed above may suggest modifications that may be made to the current method discussed above. Referring now to FIGS. 4 and 5, the basic three-message handshake is kept and remains part of the TDLS Setup Procedure. In general, the example method may allow the WTRUs to select one of a number of approaches to arrive at a TPK, which is a master key in key hierarchy methods. For example, the GDLMK may be a form of a TPK. In one instance, the GDLMK takes the place of the TPK as defined in amendment 11z. These approaches may be referred to as Key Management Suites (KMSs). To facilitate KMS, an additional information element, the KMS Index (KMSI), may be introduced. Depending on which KMS is selected, the existing nonces, SNonce and ANonce, may not be necessary. For example, the NonceG may be used. Alternatively, the existing nonce fields (SNonce and ANonce) may be re-used as Nonce1 and Nonce 2 to generate the NonceG. The embodiments illustrated in FIGS. 4 and 5 both allow for a non-TDLS procedure to establish a key. In the FIG. 4 embodiment, however, the non-TDLS method is done a priori, that is before any TDLS exchange is initiated. In the FIG. 5 embodiment, the non-TDLS method is done as a result of the TDLS Setup message. Any of the key establishment approaches described above may be used.

Referring now to FIG. 4, there is illustrated an embodiment for a key exchange method between a WTRU1 400, a WTRU2 402 and a base station 410. WTRU1 400 and WTRU2 402, have already established connections 415 and 417 to the base station and network 210, respectively. A non-TDLS method may be completed to generate a TPK 420 and 425. WTRU1 400 selects a KMSI and may generate a SNonce as defined by the selected KMS and forwards it to WTRU2 402 as part of the TDLS Setup message 430. The KMSI may point to a GIIE method as disclosed herein or to some other key generation method. WTRU2 402 uses the KMS indicated by the KMSI in the TDLS Setup message. That is, WTRU1 400 and WTRU2 402 use the same KMS indicated by the selected KMSI. WTRU2 402 may generate an ANonce as defined by the KMS and forwards it to WTRU1 400 in the TDLS Response message 440. WTRU2 402 may also send the SNonce, if used, back to WTRU1 400 to associate the TDLS Setup Response 440 with the TDLS Setup Request 430. WTRU1 400 and WTRU2 402 use the common key generated in the selected KMS method. WTRU1 400 forwards the KMSI and SNonce and ANonce, if used, back to WTRU2 402 as part of the TDLS Confirm message 450. Direct link communication 460 is established upon receipt of TDLS Confirm message 450 or after some predetermined interval. Once the TDLS setup succeeds and WTRUs share a TPK, such as for example a GDLMK, the key refresh approach may depend on the desired KMSI, with any of the relevant approaches outlined above potentially supported.

Referring now to FIG. 5, there is illustrated another embodiment for a key exchange method between a WTRU1

500, a WTRU2 502 and a base station 510. WTRU1 500 and WTRU2 502 have already established connections 515 and 517 to the base station and network 510, respectively. WTRU1 500 selects a KMSI and may generate a SNonce as defined by the selected KMS and forwards it to WTRU2 502 as part of the TDLS Setup message 520. The KMSI may point to a GIIE method as disclosed herein or to some other key generation method. Alternatively, a non-TDLS method may be completed to generate keys at TPK 530. WTRU2 502 uses the KMS indicated by the KMSI in the TDLS Setup message. WTRU2 502 may generate a ANonce as defined by the KMS and forwards it to WTRU1 500 in the TDLS Response message 540. WTRU2 502 may also send the SNonce, if used, back to WTRU1 500 to associate the TDLS Setup Response 540 with the TDLS Setup Request 520. WTRU1 500 and WTRU2 502 use the common key generated in the selected KMS method. WTRU1 500 forwards the KMSI and SNonce and ANonce, if used, back to WTRU2 502 as part of the TDLS Confirm message 550. Direct link communication 560 is established upon receipt of TDLS Confirm message 550 or after some predetermined interval. Once the TDLS setup succeeds and WTRUs share a TPK, such as for example a GDLMK, the key refresh approach may depend on the desired KMSI, with any of the relevant approaches outlined above potentially supported.

Figure 6:
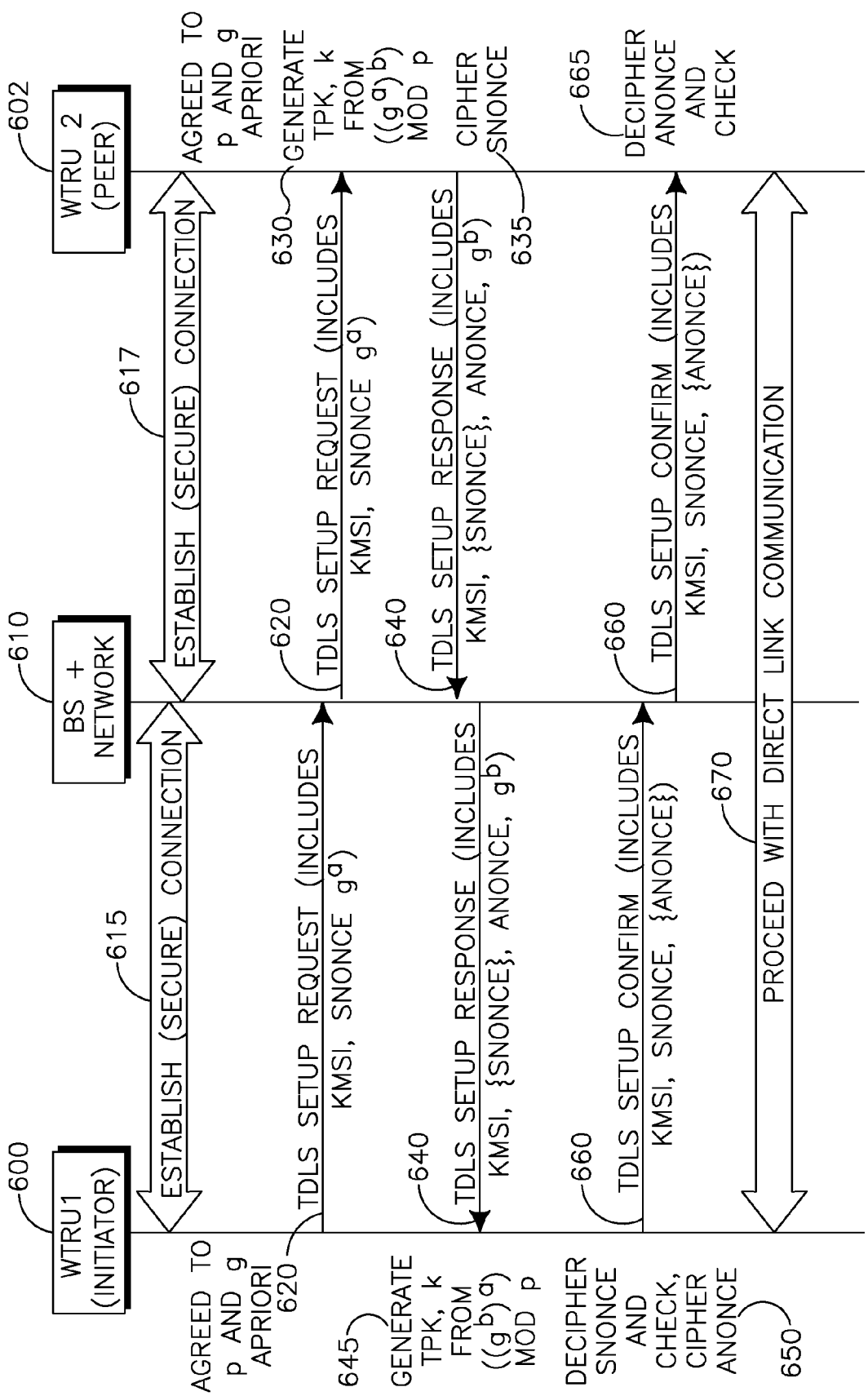
FIG. 6 is a diagram showing a Diffie-Hellman key exchange method according to an embodiment.

Referring now to FIG. 6, a public key exchange is illustrated between a WTRU1 600, WTRU2 602 and base station 610. In this embodiment, a Diffie-Hellman key exchange is used for illustration purposes. WTRU1 600 and WTRU2 602 have already established connections 615 and 617 to the base station and network 610, respectively. The parameters p and g for the Diffie-Hellman key exchange method are agreed upon a priori by WTRU1 600 and WTRU2 602. WTRU1 600 selects a KMSI and may generate a SNonce as defined by the selected KMS and forwards it along with $g^a$ to WTRU2 602 as part of the TDLS Setup message 620. WTRU2 602 generates a TPK (630). WTRU2 602 selects a KMSI and may generate a ANonce as defined by the KMS. WTRU2 602 ciphers the SNonce (635) and forwards it along with the ANonce and $g^b$ to WTRU1 600 in the TDLS Response message 640. WTRU1 600 generates a TPK (645). WTRU1 600 deciphers the SNonce, verifies the value and ciphers the ANonce (650). WTRU1 600 sends the KMSI, ciphered ANonce and SNonce back to WTRU2 602 as part of the TDLS Confirm message 660. WTRU2 602 deciphers the ANonce and verifies the value (665). Direct link communication 670 is established upon successful receipt of TDLS Confirm message 660 or after some predetermined interval.

The key agreement methods defined above may be extended to group key agreements for groups of more than two WTRUs. In particular, TDLS_EAP may be extended as follows. Suppose that there are N WTRUs. Each WTRU establishes a RSN with the base station and then generates, and has the base station broadcast, its own nonce (Nonce for WTRU i). All WTRUs may then have all nonces and may generate a common nonce (NonceG) from all of these, for example, using approaches outlined above. Once NonceG's are generated, each WTRU may run TDLS_EAP (as described above), and the AAA server may associate all N WTRUs with each other via NonceG. Each WTRU may also generate a common GDLMK for it, which it may communicate, for example, using WTRU specific GKEKs and GKCKs as described above.

Figure 7:
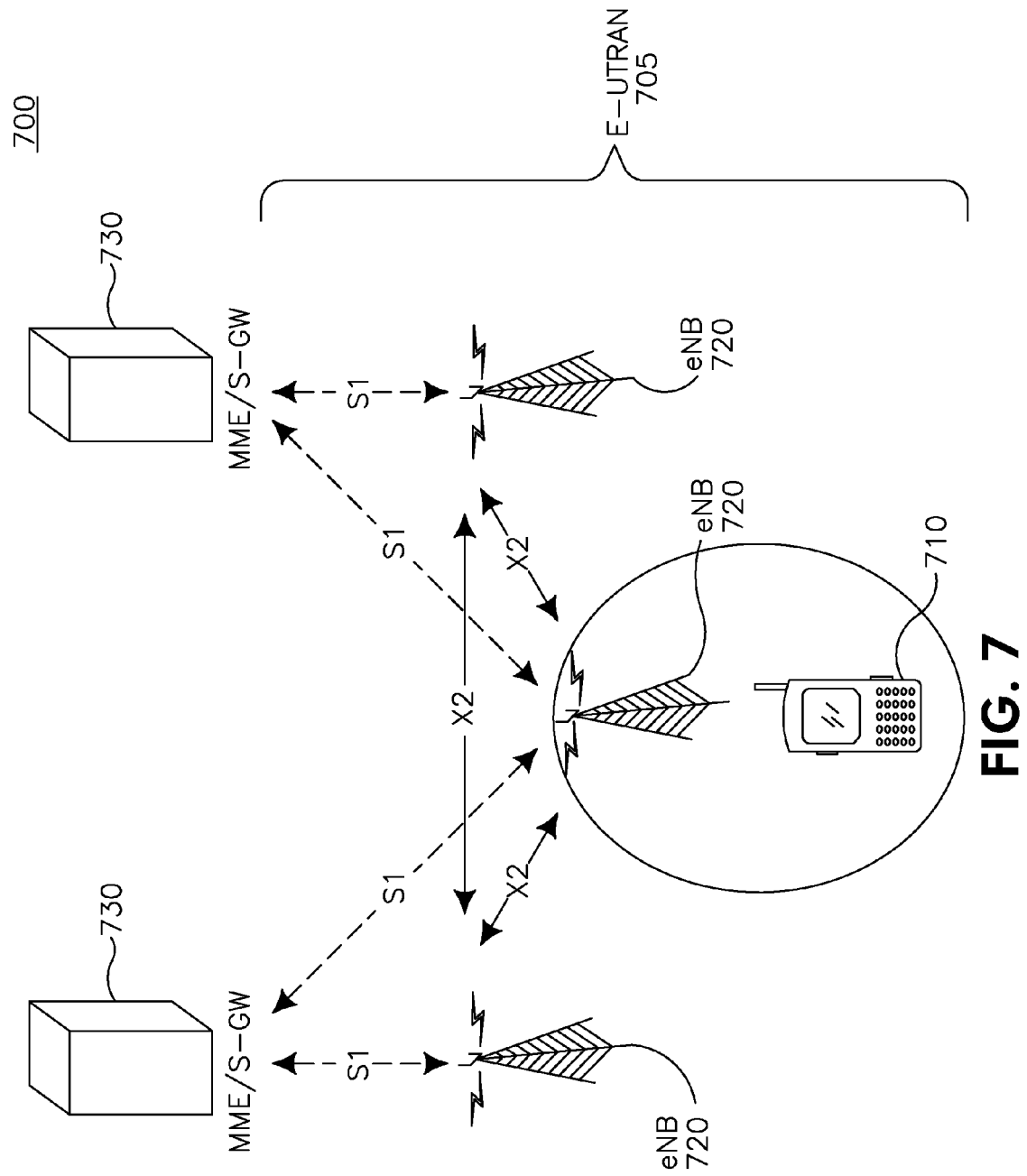
FIG. 7 is an embodiment of a wireless communication system/access network of long term evolution (LTE)

Although the above is disclosed with respect to 802.11, it is applicable to any wireless environment. For example, FIG. 7 shows a Long Term Evolution (LTE) wireless communication system/access network 700 that includes an Evolved-Universal Terrestrial Radio Access Network (E-UTRAN) 705. The E-UTRAN 705 includes a WTRU 710 and several evolved Node-Bs, (eNBs) 720. The WTRU 710 is in communication with an eNB 720. The eNBs 720 interface with each other using an X2 interface. Each of the eNBs 720 interface with a Mobility Management Entity (MME)/Serving GateWay (S-GW) 730 through an S1 interface. Although a single WTRU 710 and three eNBs 720 are shown in FIG. 7, it should be apparent that any combination of wireless and wired devices may be included in the wireless communication system access network 700.

Figure 8:
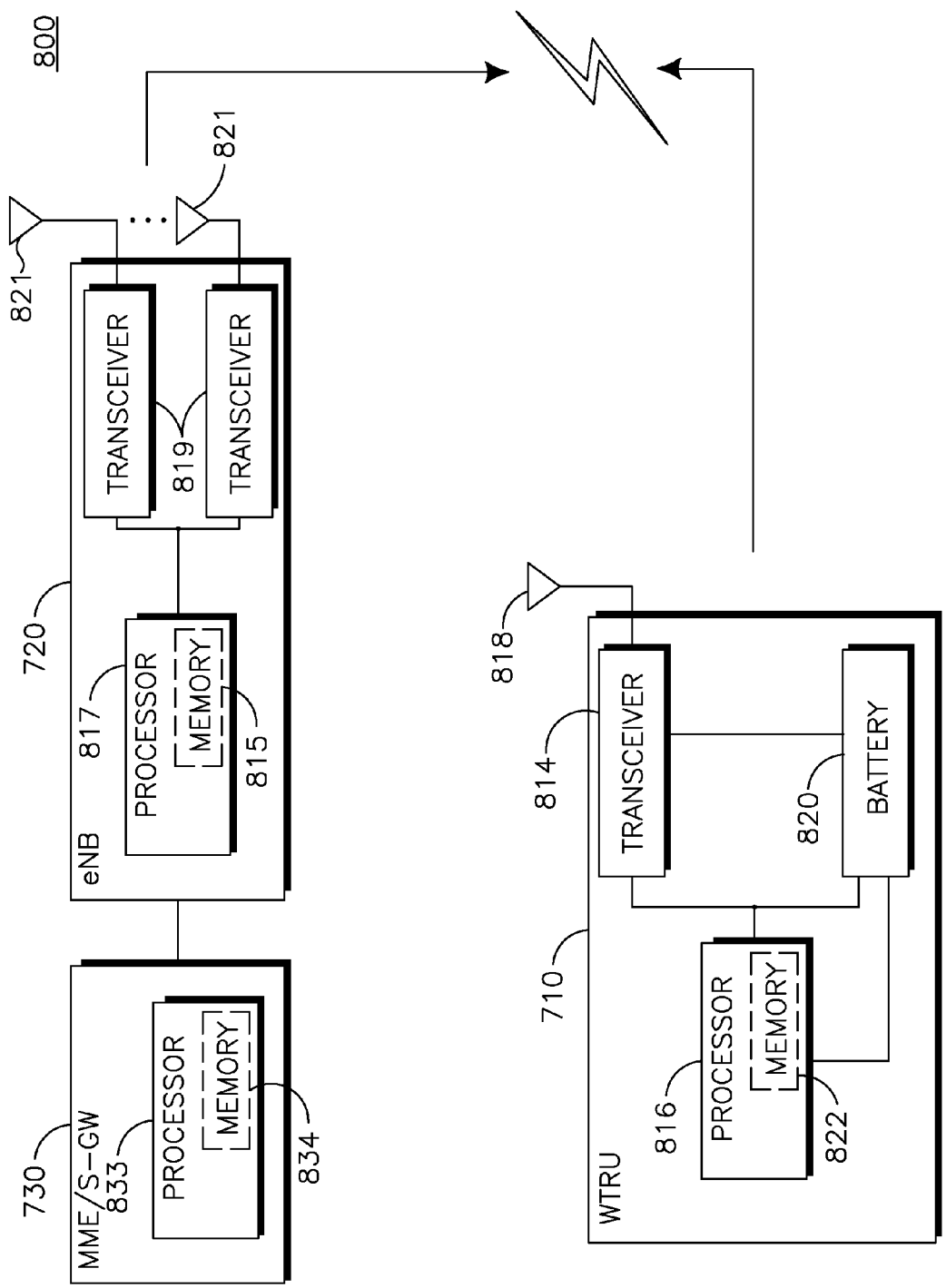
FIG. 8 are example block diagrams of a wireless transmit/receive unit and a base station of the LTE wireless communication system.

FIG. 8 is an example block diagram of an LTE wireless communication system 700 including the WTRU 710, the eNB 720, and the MME/S-GW 730. As shown in FIG. 8, the WTRU 710, the eNB 720 and the MME/S-GW 730 are configured to enhance direct link communication security.

In addition to the components that may be found in a typical WTRU, the WTRU 710 includes a processor 816 with an optional linked memory 822, at least one transceiver 814, an optional battery 820, and an antenna 818. The processor 816 is configured to enhance direct link communication security. The transceiver 814 is in communication with the processor 816 and the antenna 818 to facilitate the transmission and reception of wireless communications. In case a battery 820 is used in the WTRU 710, it powers the transceiver 814 and the processor 816.

In addition to the components that may be found in a typical eNB, the eNB 720 includes a processor 817 with an optional linked memory 815, transceivers 819, and antennas 821. The processor 817 is configured to enhance direct link communication security. The transceivers 819 are in communication with the processor 817 and antennas 821 to facilitate the transmission and reception of wireless communications. The eNB 720 is connected to the Mobility Management Entity/Serving GateWay (MME/S-GW) 730 which includes a processor 833 with an optional linked memory 834.

In general, a method for secure direct link communications is disclosed. A first nonce is transmitted to one or more WTRUs and a nonce associated with the one or more WTRUs is received from the one or more WTRUs. A common nonce is generated by securely combining the first nonce and associated nonces, A group identification information element (GIIE) is transmitted to an authentication server, where the GIIE includes at least the common nonce. A group direct link master key (GDLMK) may be received from the authentication server. The GDLMK uses the GIIE to match WTRUs as part of a key agreement group. A group key encryption key (GKEK) and a group key confirmation key (GKCK) based on the GIIE may be generated. The GKEK and GKCK may be used to decrypt a GKEK encrypted and GKCK signed GDLMK. Group direct link temporal keys (GDLTKs) may be generated for communicating with the one or more WTRUs. The GDLTKs may be refreshed during communications with the one or more WTRUs.

In another method for securing direct link communications, a key management suite (KMS) may be selected to generate temporal keys. A KMS index (KMSI) is set corresponding to a selected key management suite. A direct link may be established with the one or more WTRUs using the KMSI. The KMSI may be predetermined. The KMSI may be transmitted to in a tunnel direct link set-up (TDLS) message to the one or more WTRUs. The KMSI may designate a Diffie-Hellman key exchange or group identification information element (GIIE). If the KMSI designates a GIIE, then a first nonce may be transmitted to the one or more WTRUs and a nonce associated with the one or more WTRUs may be received from the one or more WTRUs. A common nonce may be generated as a secure combination of the first nonce and associated nonces. A GIIE may be transmitted to an authentication server. The GIIE may include the common nonce. A GDLMK may be received from the authentication server. A GKEK and GKCK may be used to decrypt a GKEK encrypted and GKCK signed group GDLMK received from the authentication server. GDLTKs may be generated for communicating with the one or more WTRUs.

Also disclosed is a WTRU that may comprise a transmitter configured to transmit a first nonce to one or more WTRUs. It may also comprise a receiver configured to receive a nonce associated with the one or more WTRUs. A processor may be configured to generate a common nonce, wherein the common nonce is a secure combination of the first nonce and associated nonces. The transmitter may be configured to transmit a GIIE to an authentication server, wherein the GIIE includes at least the common nonce. The receiver may be configured to receive a GDLMK from the authentication server, wherein the GDLMK uses the GIIE to match WTRUs as part of a key agreement group. A processor may be configured to generate a GKEK and GKCK based on the GIIE. The GKEK and GKCK may be used to decrypt a GKEK encrypted and GKCK signed GDLMK received from the authentication server, wherein the GDLMK uses the GIIE to match WTRUs as part of a key agreement group. The processor may be configured to generate GDLTKs for communicating with the one or more WTRUs.

Another embodiment of a WTRU may have a transmitter, a receiver, and a processor. The processor may be configured to select a key management suite (KMS) to generate temporal keys. The processor may be configured to set a KMSI corresponding to a selected key management suite. The transmitter, receiver and processor may be configured to establish a direct link with one or more WTRUs using the KMSI.

Also disclosed is a method for WTRU authentication. The method may include initiating authentication with an authentication entity, sending a GIIE to the authentication entity, and receiving a group key from the authentication entity. The group key may use the GIIE to associate the WTRU and other WTRUs in a group. The GIIE may include a common nonce. A GKEK and GKCK may be based on the GIIE. The GKEK and GKCK may be used to decrypt a GKEK encrypted and GKCK signed group key.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method, implemented at a first wireless transmit/receive unit (WTRU), for secure direct link communication, the method comprising:
   generating, by the first WTRU, a first nonce;
   exchanging, by the first WTRU, the first nonce and a second nonce associated with a second WTRU;
   subsequent to exchanging the first nonce and the second nonce, generating, by the first WTRU, a common nonce that is common to the first WTRU and the second WTRU, wherein the common nonce is derived from the exchanged first and second nonces;
   transmitting, by the first WTRU, group identification information including the common nonce to an authentication server; and
   receiving, by the first WTRU, a master key from the authentication server, wherein the master key is securely encrypted uniquely for the first WTRU.

2. The method of claim 1, wherein the master key uses the group identification information to match WTRUs as part of a key agreement group.

3. The method of claim 1, wherein the common nonce is a session key.

4. The method of claim 1, further comprising:
   deriving, by the first WTRU, a group key encryption key (GKEK) and a group key confirmation key (GKCK).

5. The method of claim 4, wherein the GKEK and GKCK are used to decrypt a GKEK encrypted and GKCK signed master key received from the authentication server, the master key using the group identification information to match WTRUs as part of a key agreement group.

6. The method of claim 1, further comprising:
   generating, by the first WTRU, a group direct link temporal key (GDLTK) for communicating with the second WTRU.

7. The method of claim 6, further comprising:
   transmitting, by the first WTRU, data encrypted with the GDLTK directly to the second WTRU.

8. The method of claim 6, further comprising:
   refreshing, by the first WTRU, the GDLTK during communication with the second WTRU.

9. The method of claim 1, wherein the master key is derived from the common nonce.

10. The method of claim 1, wherein exchanging the first nonce and the second nonce enables the second WTRU to generate the common nonce.

11. A first wireless transmit/receive unit (WTRU), comprising:
   a processor configured to generate a first nonce;

a transceiver operatively coupled to the processor configured to exchange the first nonce and a second nonce, associated with a second WTRU, with the second WTRU;

the processor further configured to generate, subsequent to exchanging the first nonce and the second nonce, a common nonce that is common to the first WTRU and the second WTRU, wherein the common nonce is derived from the exchanged first and second nonces;

the transceiver and processor further configured to transmit group identification information including at least the common nonce to an authentication server; and the transceiver and processor further configured to receive a master key from the authentication server, wherein the master key is securely encrypted uniquely for the first WTRU.

12. The first WTRU of claim 11, wherein the master key uses the group identification information to match WTRUs as part of a key agreement group.

13. The first WTRU of claim 11, wherein the common nonce is a session key.

14. The first WTRU of claim 11, wherein the processor is further configured to derive a group key encryption key (GKEK) and a group key confirmation key (GKCK).

15. The first WTRU of claim 14, wherein the processor is further configured to use the GKEK and GKCK to decrypt a GKEK encrypted and GKCK signed master key received from the authentication server, the master key using the group identification information to match WTRUs as part of a key agreement group.

16. The first WTRU of claim 11, wherein the processor is further configured to generate a group direct link temporal key (GDLTK) for communicating with the second WTRU.

17. The first WTRU of claim 16, wherein the transceiver is further configured to transmit data encrypted with the GDLTK directly to the second WTRU.

18. The first WTRU of claim 16, wherein the processor is further configured to refresh the GDLTK during communication with the second WTRU.

19. The first WTRU of claim 11, wherein the master key is derived from the common nonce.

20. The first WTRU of claim 11, wherein exchanging the first nonce and the second nonce enables the second WTRU to generate the common nonce.

* * * * *